(12) United States Patent
Featherstone et al.

(10) Patent No.: US 11,871,272 B2
(45) Date of Patent: Jan. 9, 2024

(54) TECHNIQUES FOR COMMUNICATION PATH SELECTION IN AN EDGE ENVIRONMENT

(71) Applicant: Samsung Electronics Co., Ltd., Suwon-si (KR)

(72) Inventors: Walter Featherstone, Staines (GB); Hyesung Kim, Suwon-si (KR); Nishant Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 17/495,349

(22) Filed: Oct. 6, 2021

(65) Prior Publication Data
US 2022/0110022 A1    Apr. 7, 2022

(30) Foreign Application Priority Data

Oct. 7, 2020   (IN) .............................. 202031043593
Sep. 30, 2021  (GB) ...................................... 2113991

(51) Int. Cl.
| H04W 28/08 | (2023.01) |
| H04W 28/12 | (2009.01) |
| H04L 12/721 | (2013.01) |
| H04L 45/12 | (2022.01) |

(52) U.S. Cl.
CPC ....... *H04W 28/0942* (2020.05); *H04L 45/124* (2013.01); *H04W 28/0958* (2020.05); *H04W 28/12* (2013.01)

(58) Field of Classification Search
CPC ......... H04W 28/0942; H04W 28/0958; H04W 28/12; H04W 40/02; H04W 8/24; H04L 45/124; H04L 67/1001; H04L 67/148
See application file for complete search history.

(56) References Cited

U.S. PATENT DOCUMENTS

| 2014/0098685 A1* | 4/2014 | Shattil ................... H04W 40/20 370/252 |
| 2015/0244769 A1* | 8/2015 | Khaimov ................ G06F 9/485 709/217 |
| 2017/0155928 A1* | 6/2017 | Wei ........................ H04L 65/611 |
| 2018/0316746 A1* | 11/2018 | Shattil ..................... H04L 45/70 |
| 2019/0312810 A1* | 10/2019 | Strom ................... H04L 67/104 |
| 2020/0351335 A1* | 11/2020 | Shattil ................... H04W 40/12 |
| 2022/0329649 A1* | 10/2022 | Feng ................... H04L 67/1001 |

OTHER PUBLICATIONS

Kim and Featherstone, "Path Assessment API", Nov. 16-24, 2020, 3GPP TSG-SA WG6 Meeting #40-e, S6-202071, revision of S6-20xxxx (Year: 2020).*

* cited by examiner

*Primary Examiner* — Luat Phung
(74) *Attorney, Agent, or Firm* — Jefferson IP Law, LLP

(57) ABSTRACT

A method of determining a communication path between a source edge application server (sEAS) and a target edge application server (tEAS) are provided. The method includes identifying a plurality of possible communication paths between the sEAS and the tEAS, and selecting one of the plurality of possible communication paths between the sEAS and the tEAS according to one or more predefined criteria.

10 Claims, 9 Drawing Sheets

| Information element | Status | Description |
|---|---|---|
| Requestor identifier | M | The ID of the requestor (i.e. EAS ID) |
| UE identifier | M | Identifies the UE for which application context transfer is requested. |
| Security credentials | M | Security credentials of the source Edge Application Server. |
| Path assessment | O | EAS performed inter-EAS path assessment. This could be a list. |
| >Path identifier | M | Identifier for the path. |
| >Path gateway | M | Path configured gateway, e.g. the gateway IP address |
| >Path KPIs | M | Path performance assessment, e.g. latency, bandwidth, load, reliability, maximum transmission unit, cost (metric value). |
| >Path info | O | Finer granularity route information, e.g. number of hops, KPI per hop, IP router locations (associated with each hop). |

Communication Path Assessment request

FIG.8

| Information element | Status | Description |
|---|---|---|
| Path options | O | List of discovered paths |
| >Path identifier | M | Identifier for the path |
| >Path gateway | O | The gateway address that the EAS should use for the path when transferring application context for the UE identified in the request (see note 1 below). |
| >Path KPIs | O | Path performance assessment, e.g. latency, bandwidth, load, reliability, maximum transmission unit, cost (metric value) (see note 2 below). |
| >Path info | O | Finer granularity route information, e.g. number of hops, KPI per hop, IP router locations. |
| >Path route | O | Providing an indication of the path route, e.g. intra-PLMN, cloud (reference Figure 2) |
| Failure response | O | Indicates that the request failed. |
| > Cause | O | Indicates the cause of request failure. |
| NOTE 1: Mandatory if the path identifier is not one of those provided by the requestor (e.g. EAS) in the request.<br><br>NOTE 2: It is mandatory to provide a value for the same KPI per path if more than one path option. | | |

Communication Path Assessment response

FIG.9

TECHNIQUES FOR COMMUNICATION PATH SELECTION IN AN EDGE ENVIRONMENT

CROSS-REFERENCE TO RELATED APPLICATION(S)

This application is based on and claims priority under 35 U.S.C. § 119(a) of an Indian patent application number 202031043593, filed on Oct. 7, 2020, in the Indian Patent Office, and of a United Kingdom patent application number 2113991.0, filed on Sep. 30, 2021, in the Intellectual Property Office of the United Kingdom, the disclosure of each of which is incorporated by reference herein in its entirety.

BACKGROUND

1. Field

The disclosure relates to edge networks. More particularly, the disclosure relates to improvements relating to communication path selection.

2. Description of Related Art

FIG. 1 shows an architecture for enabling edge applications, according to the related art.

Work is ongoing to define an enabling layer to facilitate communication between application clients (AC) running on the user equipment (UE) and the edge application servers (EAS) deployed on the edge data network (EDN). This includes aspects regarding service provisioning and EAS discovery. In addition, it is an aim to provide support services such as application context transfer between EASs for service continuity, service enablement and capability exposure APIs towards the EAS. The architecture is depicted in FIG. 1, which shows the interconnection between UE 10, the 3GPP core network 20 and the edge Data Network 30.

The architecture (documented in 3GPP TS 23.558) comprises an edge enabler server (EES) 32 in EDN 30, primarily responsible for enabling discovery of the EASs 31, edge enabler client (EEC) 12, providing support functions, such as EAS discovery to the ACs 11 in the UE 10, and, edge configuration server (ECS) 33, providing configurations to the EEC to connect with an EAS 31. Together, the EEC 12, EES 32 and ECS 33 make up the edge enabling layer.

In conjunction with the 3GPP network 20, the edge enabling layer offers support for several edge specific capabilities. Of particular relevance here is the support for service continuity. With UE mobility, the serving edge or cloud may change or become more suitable for serving the AC 11. To enable continuity of service in such scenarios, the architecture supports transfer of a UE's application context between a source and target EAS to enable seamless service continuity. It is an aim of embodiments of the disclosure to address issues associated with this and the more general issue of inter EAS communication, whether mentioned explicitly or not.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is provided an apparatus and method as set forth in the appended claims. Other features of the disclosure will be apparent from the dependent claims, and the description which follows.

Additional aspects will be set forth in part in the description which follows and, in part, will be apparent from the description, or may be learned by practice of the presented embodiments.

In accordance with an aspect of the disclosure, a method of determining a communication path between a source edge application server (sEAS), and a target edge application server (tEAS) is provided. The method includes identifying a plurality of possible communication paths between the sEAS and the tEAS, and selecting one of the plurality of possible communication paths between the sEAS and the tEAS according to one or more predefined criteria.

In an embodiment of the disclosure, the method may further comprise transferring an application context from the sEAS to the tEAS via the selected one of the plurality of possible communication paths between the sEAS and the tEAS.

In an embodiment of the disclosure, the predefined criteria may include one or more of a cost associated with one or more of the plurality of possible communication paths between the sEAS and the tEAS, a latency of one or more of the plurality of possible communication paths between the sEAS and the tEAS, a nature of data to be transferred, or a size of the data to be transferred.

In an embodiment of the disclosure, the plurality of possible communication paths between the sEAS and the tEAS may comprise at least one of communication between the sEAS and the tEAS outside public land mobile network (PLMN), but within a data network (DN), communication between the sEAS and the tEAS outside the PLMN via a cloud, communication between the sEAS and the tEAS via at least one of the PLMN, communication between the sEAS and the tEAS is via one or more edge enabler servers (EESs), where communication between the one or more of the EESs is outside the PLMN, but within the DN, communication between the sEAS and the tEAS is via one or more of the EESs, where communication between the one or more of the EESs is outside the PLMN, via cloud, communication between the sEAS and the tEAS is via one or more of the EESs, where communication between the one or more of the EESs is via the PLMN, or communication between the sEAS and the tEAS is via one or more of the EESs, where communication between the one or more of the EESs is via an edge enabler client (EEC).

In an embodiment of the disclosure, the sEAS and the tEAS may be provided in different edge data networks (EDNs), offered by one or more providers.

In an embodiment of the disclosure, the sEAS and the tEAS may be provided in a same edge data network (EDN), offered by one or more providers.

In an embodiment of the disclosure, the identifying may be performed by an edge enabler layer.

In an embodiment of the disclosure, the edge enable layer may comprise at least one of an edge enabler client (EEC), an edge enabler server (EES) or an edge configuration server (ECS).

In an embodiment of the disclosure, the selecting may be performed by one of the sEAS, a source edge enabler server (sEES), the tEAS, or an edge configuration server (tEES).

In accordance with another aspect of the disclosure, an edge network configured to perform the method of the above aspect is provided.

Although a few preferred embodiments of the disclosure have been shown and described, it will be appreciated by those skilled in the art that various changes and modifications might be made without departing from the scope of the disclosure, as defined in the appended claims.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 shows a table of parameters related to communication path assessment request, according to an embodiment of the disclosure; and FIG. 9 shows a table of parameters related to communication path assessment response, according to an embodiment of the disclosure.

Throughout the drawings, like reference numerals will be understood to refer to like parts, components, and structures.

DETAILED DESCRIPTION

Figure 1:
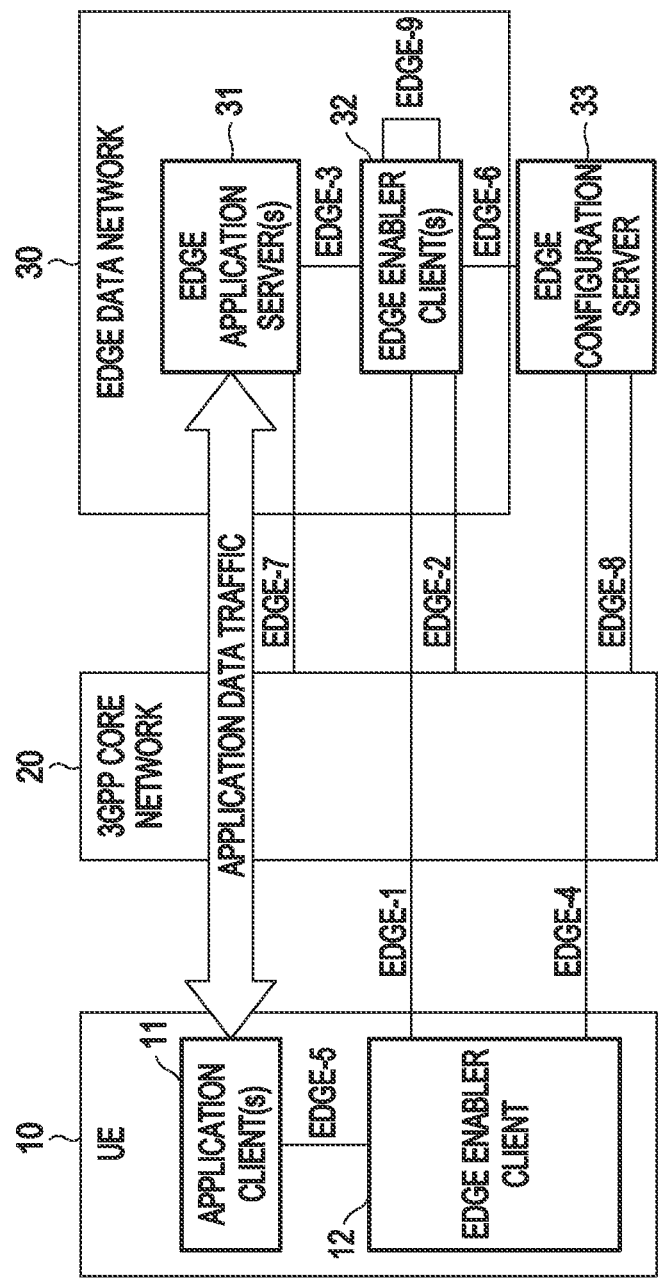
FIG. 1 shows an architecture for enabling edge applications, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the disclosure address the problem of how to minimize the transfer time and therefore any service interruption of transferring application context (state information associated with an AC's interaction and utilization of an EAS) between a source and target EAS in order to preserve service continuity. Such a transfer may be triggered for a number of reasons including: UE mobility, where the UE moves out of the EAS or EDN service area; overload situations in the source EAS or EDN; and maintenance aspects where the source EAS may be shutdown.

Embodiments of the disclosure address the problem of minimizing service interruption, by the edge enabler layer using its knowledge of the different communication path options that may exist between the various EASs to identify and then utilize the option that would offer the lowest application context transfer time.

The assessment of each communication path may be based on its performance characteristics (e.g., latency, throughput, etc.), which may be dynamic in nature (e.g., congestion dependent), and an estimate of the application context size, which may also be dynamic. Therefore, although minimizing the transfer time is considered a key objective, there may be other significant factors that dictate path selection. These may include path cost where, for example, the path via an operator's network may offer lower transport costs than via the regular internet. This could be based on, for instance, the business relationship the application provider has with the network operator. Selection preferences may also be provided via the UE 10 with the connection to the application, for example via the EEC 12.

Figure 2:
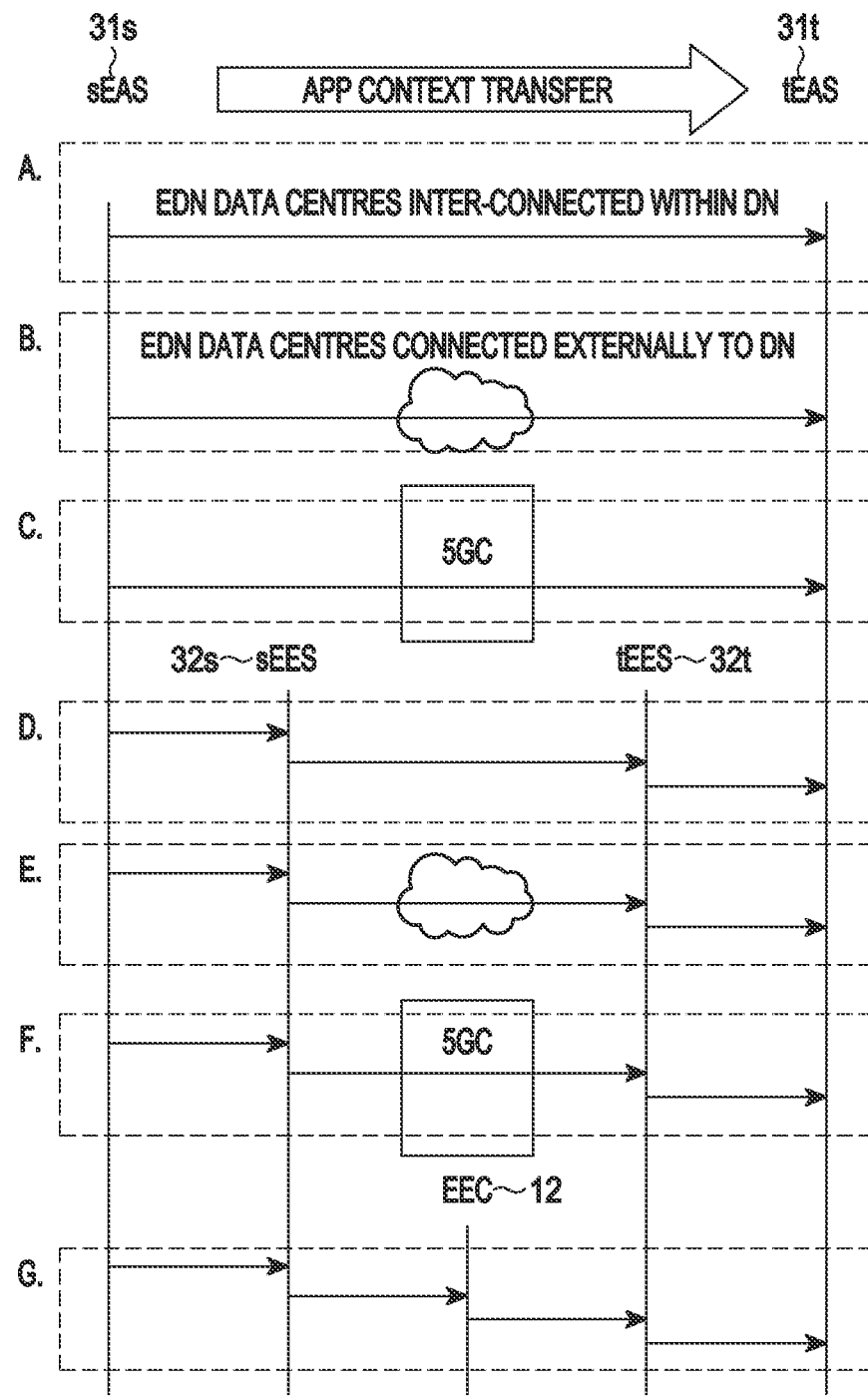
FIG. 2 shows various communication options for application context transfer between a source and target edge application server (EAS), according to an embodiment of the disclosure.

FIG. 2 shows various communication options for application context transfer between a source and target edge Application Server, according to embodiment of the disclosure.

Possible communication options according to various embodiments of the disclosure are identified in FIG. 2 as options A to G. Which options are available in any given scenario is highly deployment dependent. There may also be additional options not depicted.

The edge enabler layer, specifically the source EES (sEES 32s) shown in FIG. 2 can offer the optimum communication option to the source EAS, based on, for example, an assessment of the application context size and communication path options, when application context transfer is deemed necessary and instructs the EAS where to send the context accordingly.

Alternatively, the source EES 32s may provide the communication options and the performance assessment of those to the EAS for the EAS to make the selection itself. As highlighted earlier, the final path selection may be based on several factors that may be specific to a user of the application (i.e., user specific), as well as being specific to the application (EAS) itself.

Figure 6:
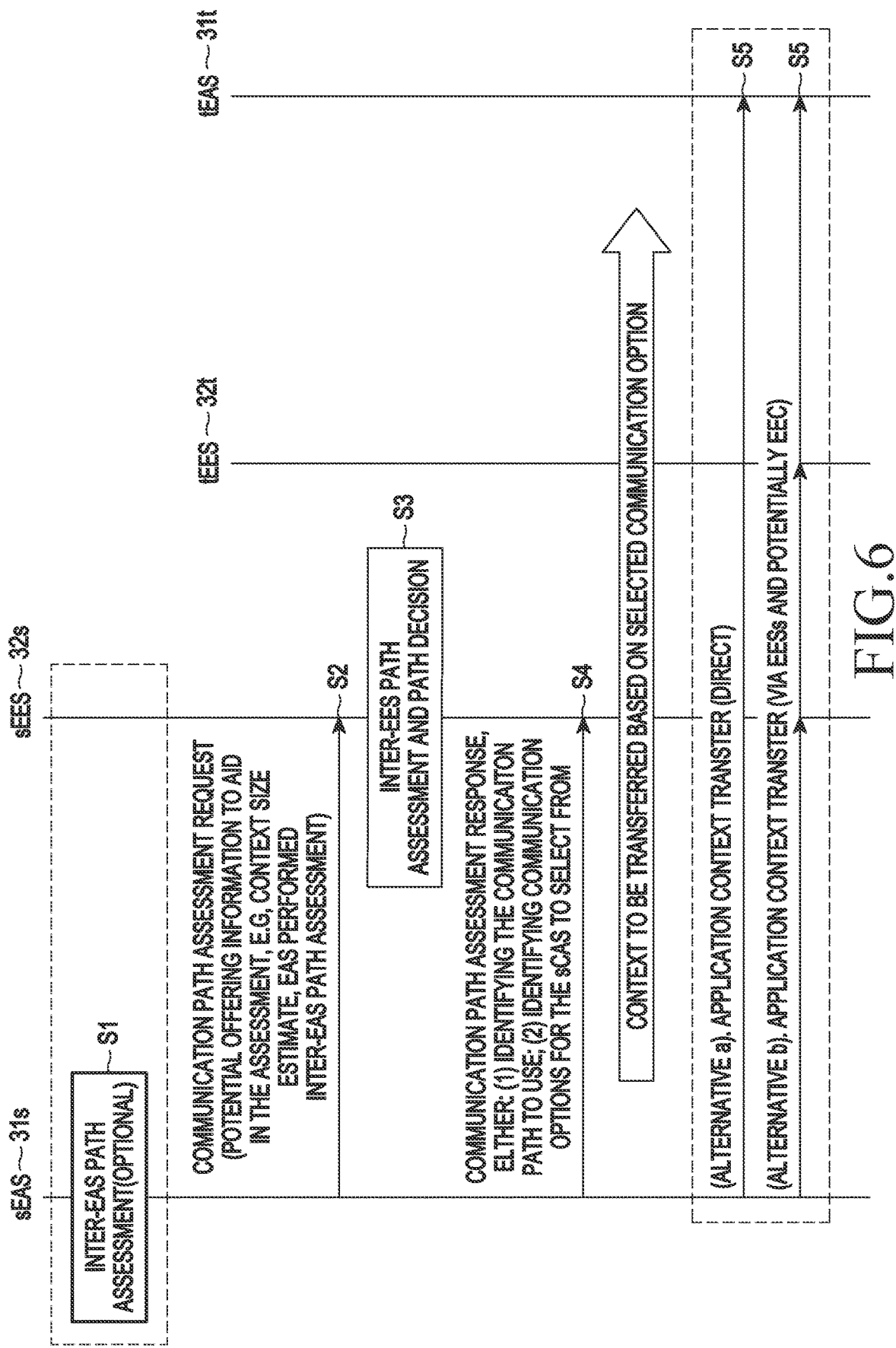
FIG. 6 shows a message flow for path selection and subsequent application context transfer, according to an embodiment of the disclosure.

FIG. 6 shows a message flow for path selection and subsequent application context transfer, according to an embodiment of the disclosure.

The message flow is depicted in FIG. 6, where the option for the EAS to make the selection is provided as option S5b.

FIG. 6 also highlights an option whereby the EAS itself makes an assessment of the inter-EAS communication path possibilities that it is aware of. An associated report could then be passed to the sEES in the communication path assessment request to aid in the overall assessment of the full set of available communication path options.

The individual operations shown in FIG. 6 are described below:

S1. The sEAS 31s may perform an inter-EAS path assessment.

S2. The sEAS 31s sends a Path Assessment Request message to the sEES 32s. If operation S1 is performed, the result of the inter-EAS path assessment is included in the Path Assessment Request message.

S3. The sEES 32s performs inter-EES path assessment for the application context transfer from the sEAS 31s to tEAS 31t. The assessment is based on the available information in the request and additional information available to the EES that may be obtained by interaction with the gateways, orchestrators or controllers associated with each communication path option.

S4. The sEES 32s sends a Path Assessment Response message to the sEAS 31s. The response message includes information on the selected path to be used for application context transfer, or the assessment per path for the sEAS to decide from.

S5. After receiving the Path Assessment Response, the application context is transferred according to the selected path, alternative "a" or "b". Prior to the transfer, the sEES 32s may need to be instructed on the selected communication option. There may also need to be an interaction with additional entities responsible for the communication path options (e.g., network gateway, controller, orchestrator, etc.) in order influence the routing.

The previous description focused on actions initiated at the source EDN. Another alternative is initiation from the target EDN. For instance, a target EAS 31t may request the application context to be transferred from the source EAS 31s. In this scenario it may be the target EAS 31t or target EES 32t that requests and/or performs the path assessment. In this scenario, the path decision may be made within the target EDN, or options forwarded back to the source EDN for decision by either the source EAS 31s or EES 32s.

FIG. 8 shows a table of parameters related to communication path assessment request, according to an embodiment of the disclosure.

FIG. 9 shows a table of parameters related to communication path assessment response, according to an embodiment of the disclosure.

Examples of the contents of the communication path assessment request and response information flows are provided later in the tables shown respectively in FIGS. 8 and 9, including whether each information element is mandatory (M) or optional (O) through the status field. Additional information elements may also be present.

The "Path gateway" information element may be used by the EAS to route traffic (i.e., the application context) for a specific UE 10 via a specific path (e.g., route via the EES). Alternatively, specific procedures may be defined enabling the EAS to package and then send the application context to the EES, which would forward that to the target EES (via the selected communication path) and from there onto the target EAS 31t. The "Path KPIs" may be determined via various means, including use of a ping to estimate round trip time. The more detailed "Path info" could be determined through network diagnostics, for example "traceroute". Online databases are also available for IP address geolocation, i.e., IP router location. The edge enabler layer may need to interface to the network controller or orchestrator of the communication paths to support the process of obtaining determining the "Path KPIs" and ultimately dictate the communication path utilized.

When making a communication path assessment request, filtering may be optionally applied to restrict the types of path provided in the response, e.g., to restrict certain path options being explored by the EES, including, for instance, exclusion of paths that traverse certain geographical regions. The filter could also provide the preferred assessment criteria for path selection, e.g., KPI criticality.

Embodiment of the disclosure may also be applied as a selection criteria between candidate target EASs 31t, where one target EAS 31t may be selected over another based on an assessment of the communication path options between the source EAS 31s and the candidate target EASs 31t. Here it should be highlighted that identification of a suitable target EAS 31t is clearly a pre-condition to transferring application context between the source and target EAS. Furthermore, the request for the communication path assessment may be piggybacked on existing procedures. Here, one example would be the procedures relating to target EAS 31t discovery that may be initiated by various entities in the edge architecture, e.g., EEC, EAS & EES (clause "8.6 Edge Application Server discovery" when EEC initiated and clause "8.8.3.1 Discover target Edge Application Server" when EAS/ESS initiated, with reference to 3GPP TS 23.558 "Architecture for enabling Edge Applications").

Figure 7:
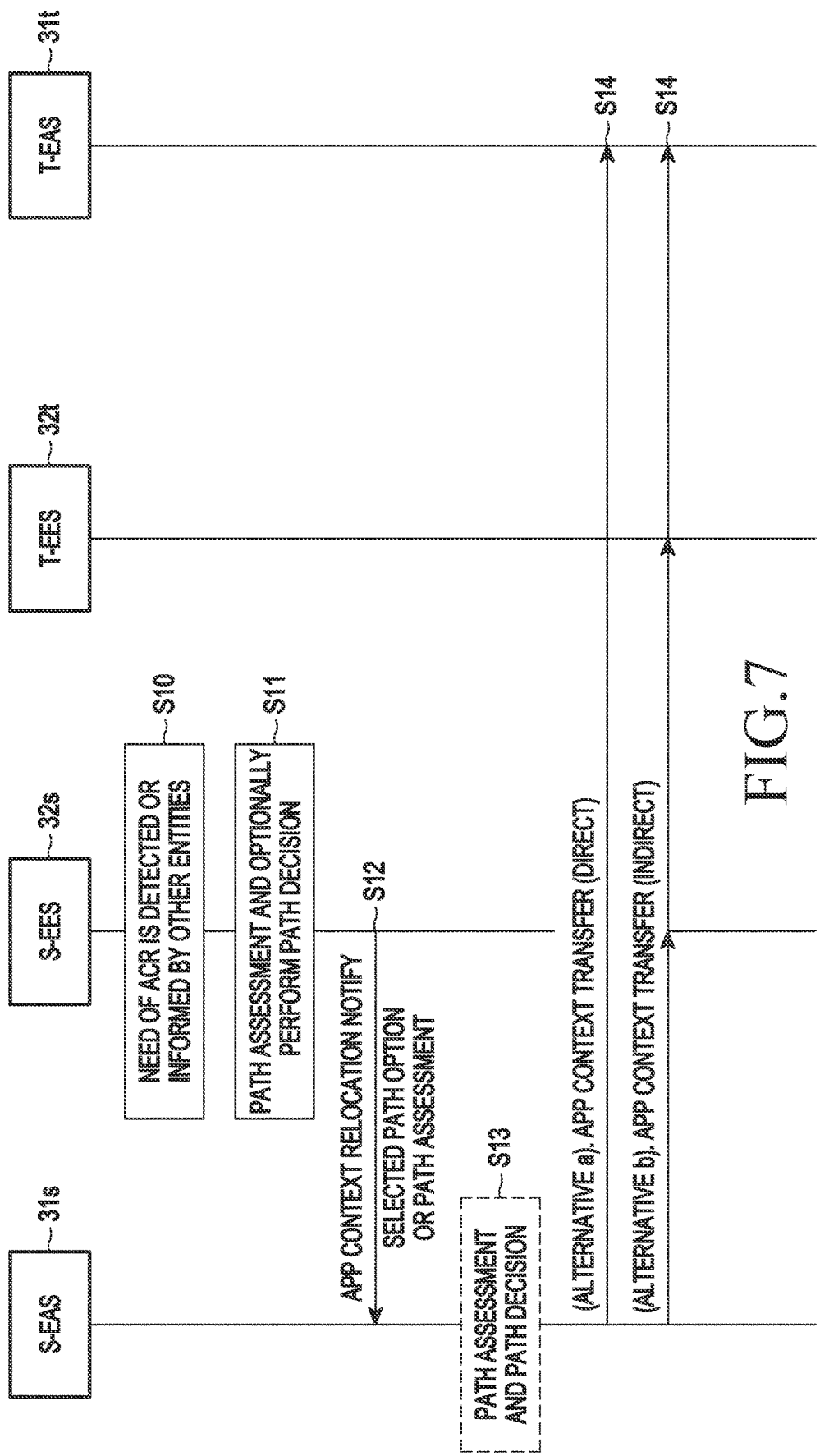
FIG. 7 shows a message flow for communication path assessment in conjunction with app context relocation notify operation, according to an embodiment of the disclosure.

FIG. 7 shows a message flow for communication path assessment in conjunction with app context relocation notify operation, according to an embodiment of the disclosure.

Another example is the application context relocation notification procedure. Referring to FIG. 7, the EES 32s may piggyback the path assessment with the application context relocation (ACR) notify message S12 sent to the EAS 31s (which is operation 5 in FIG. 8.8.2.3-1 (figure not shown here, incorporated by referece herein) of the EEC executed application context relocation scenario; or operation 1 or 3 in FIG. 8.8.2.4-1 (figure not shown here, incorporated by reference herein) of the source EAS decided application context relocation scenario; or operation 5 of FIG. 8.8.2.5 (figure not shown here, incorporated by reference herein) of the source EES executed application context relocation scenario), with reference to 3GPP TS 23.558 "Architecture for enabling Edge Applications". In this case, identification of a suitable target EAS 31t would be a precondition for sending the notify message S12, or the notify message would need to identify one or more target EASs.

The individual operations shown in FIG. 7 are described below:

S10. The sEES (S-EES) 32s detects that there is a need for Application Context Transfer.

S11. The sEES 32s performs inter-EES path assessment for the application context transfer from the sEAS (S-EAS) 31s to tEAS (T-EAS) 31t. The assessment is based on the information available to the EES that may be obtained by interaction with the network gateways, orchestrators or controllers associated with each communication path option.

S12. The sEES 32s then notifies the sEAS 31s of the need to perform Application Context Relocation to a tEAS 31t. The notification includes indication of the selected communication path option, or an assessment of the available communication options and their "Path KPIs" for selection by the sEAS 31s.

S13. Based on the information provided in the notification the sEAS 31s assesses the available communication options and makes a path decision.

S14. Once the communication path is decided upon, the application context is transferred according to the selected path, alternative "a" or "b". Prior to the transfer, the sEES 32s may need to be instructed on the selected communication option. There may also need to be an interaction with additional entities responsible for the communication path options (e.g., network gateway, controller, orchestrator, etc.) in order influence the routing.

Embodiments of the disclosure have been described in the context of transferring application context. In this scenario it is highly desirable to minimize latency to ensure service interruption is reduced when switching between EASs. However, it may also be desirable to offer alternate inter-EAS communication paths in other scenarios. For instance, when one EAS is offering a service to an EAS located in a different EDN.

FIG. 2 highlights multiple communication options for application context transfer between a source and target edge application server (sEAS 31s & tEAS 31t respectively). Here it should be noted that the EASs may be in: the same EDN; or different EDNs. Also note that the EDNs may be in: a dedicated edge-dedicated DN (with a separate centralized DN); or both part of a single DN (used for both edge and non-edge); or in local area data networks (LADNs). Finally, it should be noted that connectivity between the EDNs may be outside the public land mobile network (PLMN) via the centralized cloud, which is envisaged could be the case if EDNs are offered by different non-mobile network operator (MNO) edge compute service providers (ECSP), or different MNO providers. The inter-MNO, inter-ECSP scenarios are particularly relevant to facilitate creation of a federation of EDNs and their supporting infrastructure across multiple providers, whereby inter-provider communication between entities within different edge systems is required. Further details on selected communication options are provided below, noting that other options may exist):

The following relates to various embodiments of the disclosure. Any one or more of these may be utilized, as required in the circumstances.

Option A: Communication between EASs outside PLMN, but within DN.

In this option there is a direct communication within the DN between the two EASs (source and target). However, it will not always be the case that the two EASs are in the same DN, or even that there will be a direct communication path between data centers (hosting the EASs) within a DN.

Option B: Communication between EASs outside PLMN via cloud (external to DN).

In this option EAS connectivity traverses the cloud, which could result in a high latency due to the physical distance between the edge and the cloud point of access.

Option C: Communication between EASs via at least one PLMN.

Figure 3B:
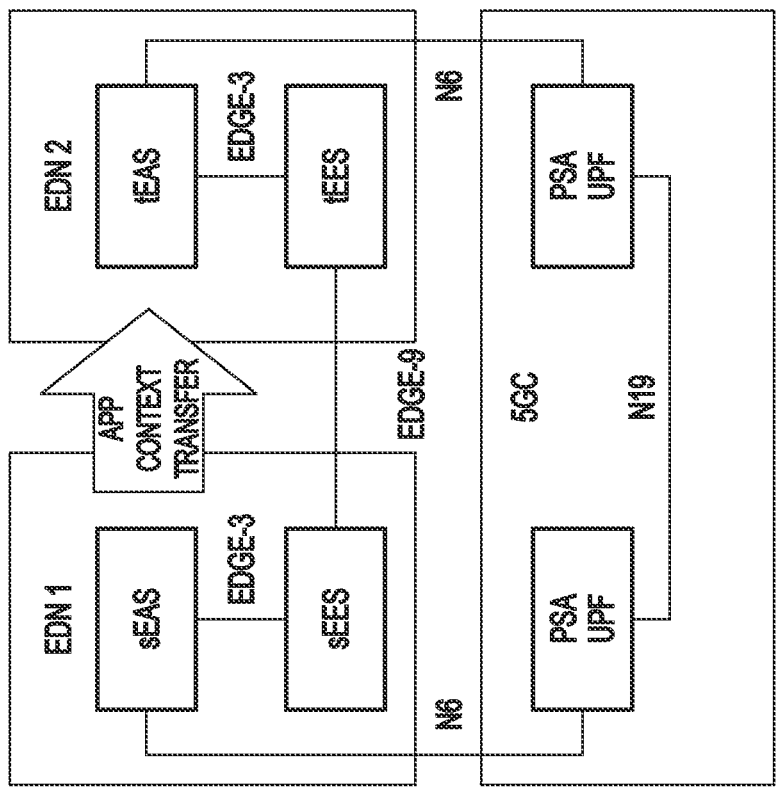
FIGS. 3A and 3B show communication between EASs via public land mobile network (PLMN) 3GPP TS 23.501, via either the N9 or N19 interface, respectively, according to various embodiments of the disclosure.
Figure 3A:
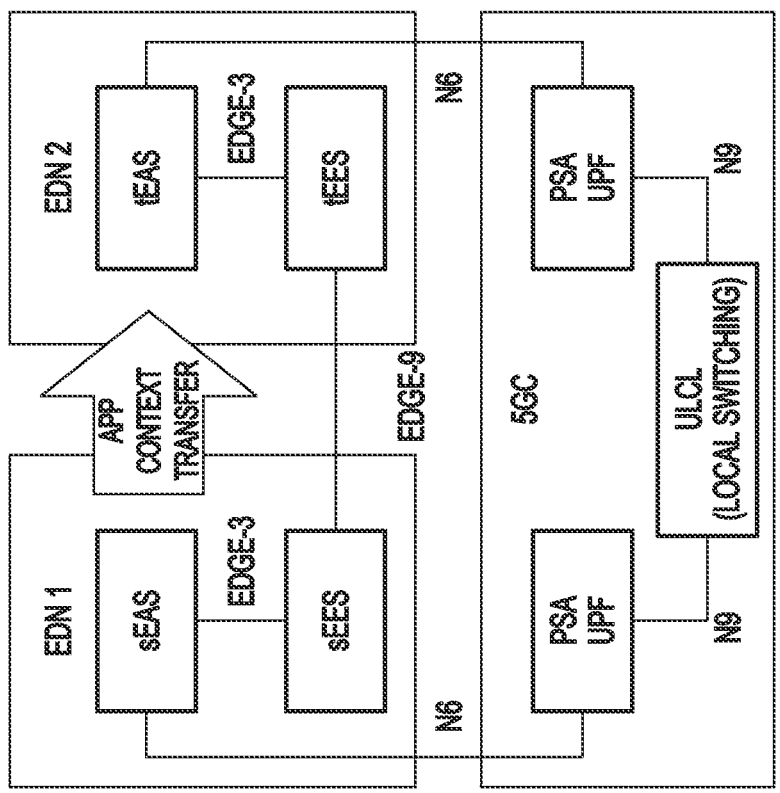

FIGS. 3A and 3B show communication between EASs via PLMN 3GPP TS 23.501, via either the N9 or N19 interface, respectively, according to various embodiments of the disclosure.

PLMN connectivity is provided via the user plane functions (UPFs) within the 5G core network (5GC) attached to the associated EDNs. Further details of this option are shown in FIGS. 3A and 3B which show different but related variants of this option, utilizing different connection options.

Figure 5:
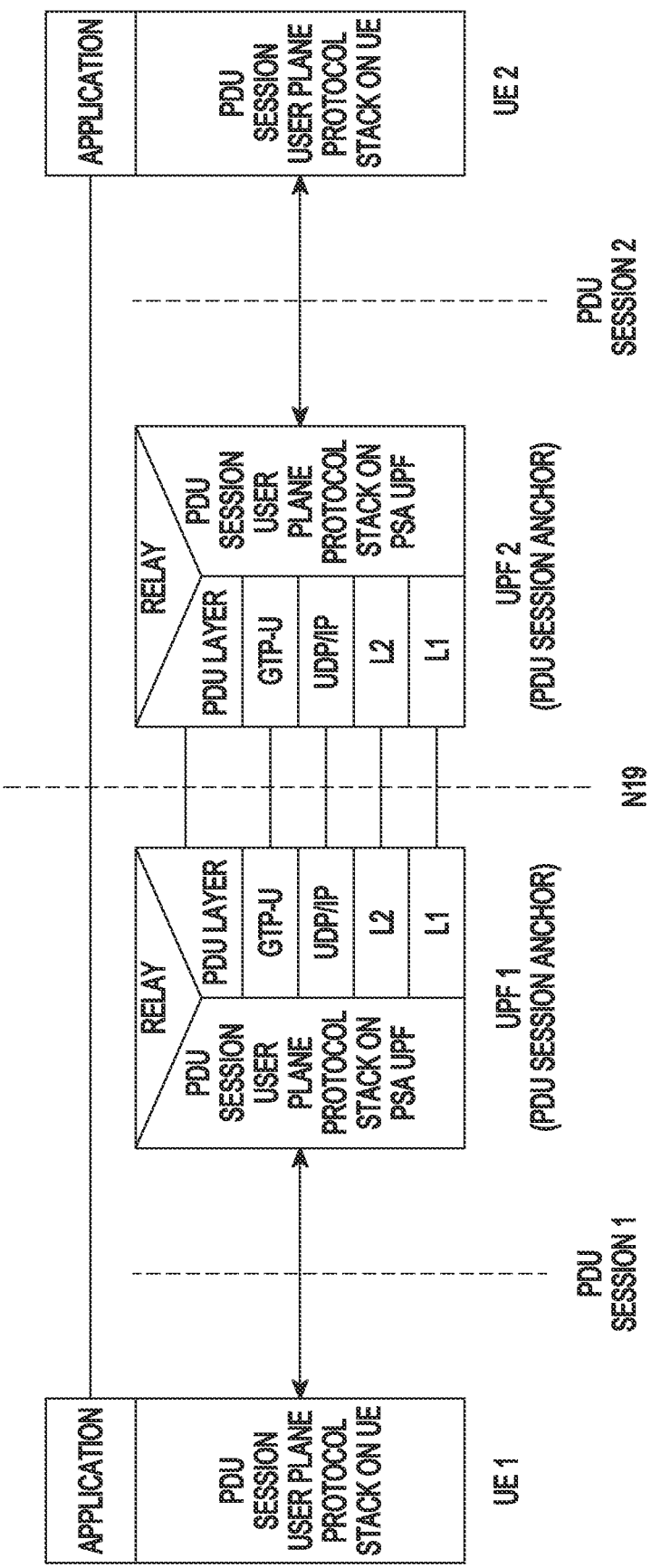
FIG. 5 shows a user plane (UP) for N19-based forwarding, according to an embodiment of the disclosure.

FIG. 5 shows a user plane (UP) for N19-based forwarding, according to an embodiment of the disclosure.

Such a UPF terminates the N6 interface of a packet data unit (PDU) session and is labelled as a PDU session anchor UPF (PSA UPF). N6, N9 & N19 are 3GPP defined reference points, (3GPP TS 23.501). This option is not supported by the related art 3GPP specifications. However, connectivity between source and target EASs may be achieved in a similar manner to the user plane for N19-based forwarding (3GPP TS 23.501, clause 8.3.5), as shown in FIG. 5, but with the applications being hosted within the EDN rather than by UEs. A similar option may be offered via N9 by making use of the 3GPP defined uplink classifier (ULCL) capabilities in order to offer local switching, as shown in FIG. 3A.

In an alternative embodiment, the PLMN provider may provide a proprietary route through the PLMN that does not directly involve 3GPP architectural components such as the UPF and associated interfaces.

The route via the PLMN may offer higher performance, e.g., lower latency, than connectivity outside the PLMN.

Note that the edge enabler layer may be used to facilitate communication between EASs via PLMN, for instance by providing information such as the appropriate socket (IP address and port number) and gateway, or interfacing with the network orchestrator or controller to influence routing decisions.

Note that more than one PLMN may be used e.g., when the source and target EASs are in different EDNs associated with different MNOs.

Options D to G involve the additional use of edge enabler servers (EES) in the source and target EDNs.

Option D: Communication between EASs via EESs. Communication between EESs outside PLMN, but within DN.

This option, along with the remaining options, rely on the edge enabler layer for transportation of the application context between EASs. In particular the source and target EES are involved (sEES and tEES respectively).

This is similar to option A, in that there is a direct communication within the DN between the two EESs (rather than the EASs, as per Option A) via the EDGE-9 interface.

Option E: Communication between EASs via EESs. Communication between EESs outside PLMN via cloud.

This is similar to option B, in that connectivity traverses the cloud. However, application context transfer is via the EESs over EDGE-9.

Option F: Communication between EASs via EESs. Communication between EESs via PLMN.

Figure 4A:
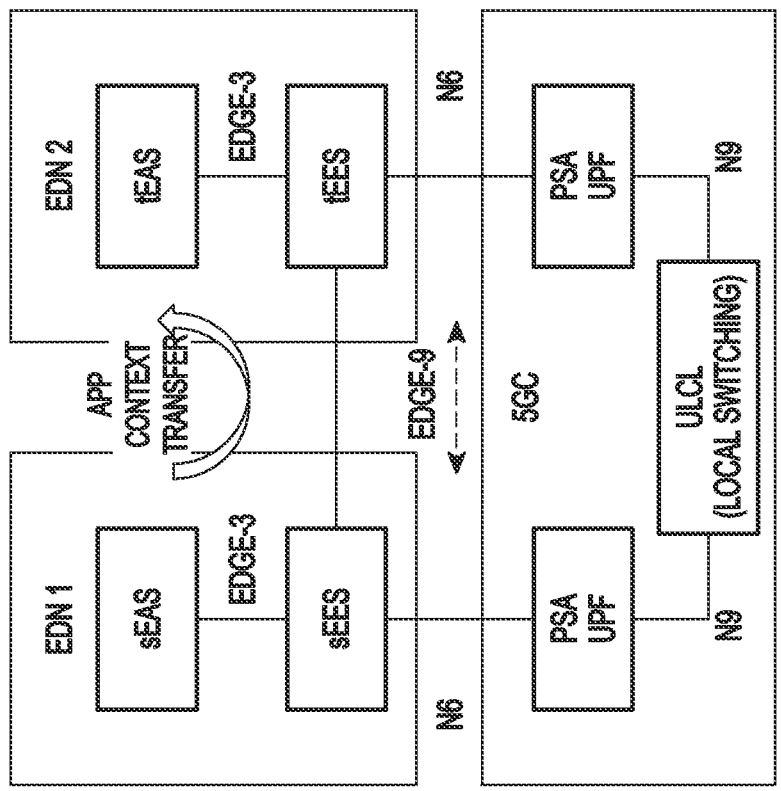
FIGS. 4A and 4B show communication between EASs via edge enabler servers (EESs) and then via PLMN 3GPP TS 23.501, via either the N19 or N9 interface, respectively according to various embodiments of the disclosure.
Figure 4B:
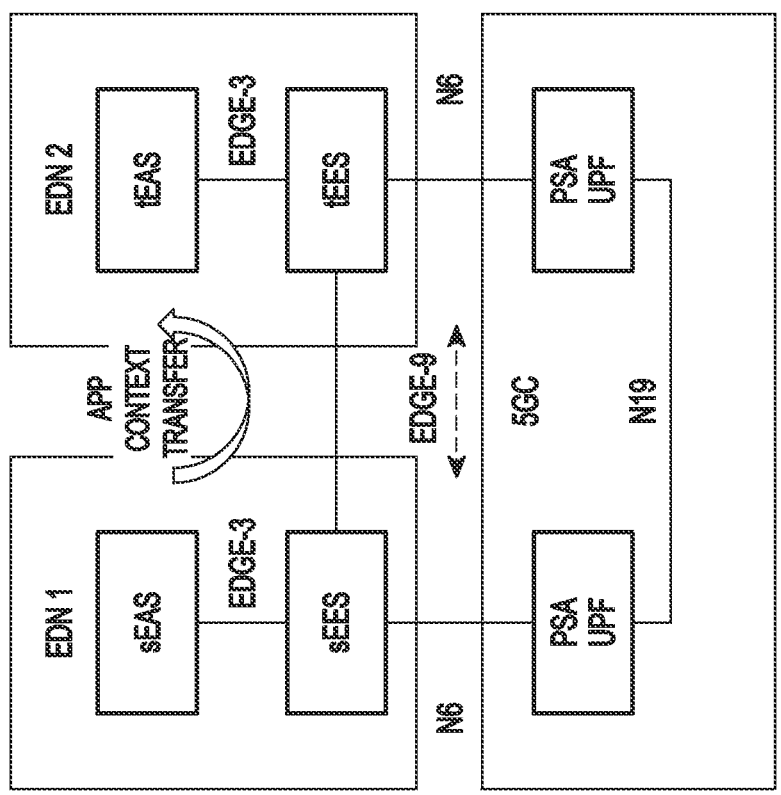

FIGS. 4A and 4B show communication between EASs via EESs and then via PLMN 3GPP TS 23.501, via either the N19 or N9 interface, respectively according to various embodiments of the disclosure.

In a similar manner to option C, PLMN connectivity is provided via UPFs within the 5GC attached to the associated EDNs. Further details are provided in FIGS. 4A and 4B.

The route via the PLMN may offer higher performance, e.g., lower latency, than connectivity outside the PLMN.

Option G: Communication between EASs via EESs. Communication between EESs via EEC.

Option E, above, is not currently supported by the 3GPP specifications. Therefore, an alternative is to specify a route using the existing EDGEAPP reference points via the UE hosted EEC. The 5G radio access network can offer extremely low latency and high throughput and therefore this routing option may offer higher performance than the previously described options, depending on the specific deployment. There may also be advantages with regards to AC communication path cutover to the target EAS from the source EAS, since the application context may be piggybacked with the request to cutover to the target EAS ensuring timing alignment of the user state at the target EAS. Also, as compared to option E, this option may more easily support inter-PLMN scenarios when there may not be an inter-PLMN communication path between UPFs.

Note that the source and target EAS may be managed by the same EES. If all three entities are in the same EDN, then direct (intra-EDN) communication between the EASs for application context transfer is possible to offer the optimum path and therefore only a single direct path option may be provided, or assessed. However, if the source and target EAS are in different EDNs, then it is still considered advantageous to consider different path options even though both EASs may be managed by the same EES.

Embodiments of the disclosure offer enhanced service continuity in the scenario that application context is transferred between a serving source EAS 31s and a target EAS 31t. This is achieved through the edge enabler layer identifying and assessing the performance and cost of the different communication path options between the source and target EAS, whilst taking into account the characteristics of the application context (e.g., size).

Embodiments of the disclosure have wider applicability than service continuity, since there are other scenarios in which EASs 31, or even EESs 32, in different EDN may wish to communicate with one another, e.g., when one EAS 31 is providing a service to another EAS or EES 32, or even when one EES 32 is providing a service to another EAS or EES.

The option of routing via the PLMN is known in the related art, but selecting across multiple routing options is not known, and neither is routing via the UE-hosted EEC 12. Potential cost implications of routing via the EEC 12 can be mitigated through application client options provided at the UE 10, which could be used to enable or disable that option on a per application basis. Allowing the EAS 31 to select amongst the options provided by the edge enabler layer, or delegate the selection to the edge enabler layer is also not known in the related art. Using a communication path assessment as part of the initial target EAS selection is an important feature of embodiments of the disclosure.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a non-transitory tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of determining a communication path between a source edge application server (sEAS), and a target edge application server (tEAS) in an edge network, the method comprising:
   receiving, by a source edge enabler server (sEES) from the sEAS, a request for a communication path assessment, wherein the request includes a path identifier, path gateway information, and path performance assessment information;
   identifying, by the sEES, a plurality of possible communication paths between the sEAS and the tEAS based on the request;
   selecting, by the sEES, one of the plurality of possible communication paths between the sEAS and the tEAS according to one or more predefined criteria; and
   transmitting, by the sEES to the sEAS via a target edge enabler server (tEES), a response for the communication path assessment including information about the selected one,
   wherein an application context from the sEAS to the tEAS is transferred via the selected one, and
   wherein the plurality of possible communication paths between the sEAS and the tEAS comprise at least one of:
      communication between the sEAS and the tEAS via the sEES and tEES, where the communication between the sEES and tEES is outside a public land mobile network (PLMN), but within a data network (DN),
      communication between the sEAS and the tEAS via the sEES and tEES, where the communication between the sEES and tEES is outside the PLMN, via a cloud, communication between the sEAS and the tEAS via the sEES and tEES, where the communication between the sEES and tEES is via the PLMN, or communication between the sEAS and the tEAS via the sEES and tEES, where the communication between the sEES and tEES is via an edge enabler client (EEC).

2. The method of claim 1, wherein the predefined criteria includes at least one of:
   a cost associated with one or more of the plurality of possible communication paths between the sEAS and the tEAS,
   a latency of one or more of the plurality of possible communication paths between the sEAS and the tEAS,
   a nature of data to be transferred, or
   a size of the data to be transferred.

3. The method of claim 1, wherein the plurality of possible communication paths between the sEAS and the tEAS further comprise at least one of:
   communication between the sEAS and the tEAS outside the PLMN, but within the DN,
   communication between the sEAS and the tEAS outside the PLMN via the cloud, or
   communication between the sEAS and the tEAS via at least one of the PLMN.

4. The method of claim 1, wherein the sEAS and the tEAS are provided in a same edge data network (EDN), offered by one or more providers.

5. The method of claim 1, wherein the sEAS and the tEAS are provided in different edge data networks (EDNs), offered by one or more providers.

6. An edge network comprising:
   a source edge application server (sEAS); and
   a source edge enabler server (sEES),
   wherein the sEES is configured to:
      receive, from the sEAS, a request for a communication path assessment, wherein the request includes a path identifier, path gateway information, and path performance assessment information,
      identify a plurality of possible communication paths between the sEAS and the tEAS based on the request,
      select one of the plurality of possible communication paths between the sEAS and the tEAS according to one or more predefined criteria, and
      transmitting, to the sEAS via a target edge enabler server (tEES), a response for the communication path assessment including information about the selected one,
   wherein an application context from the sEAS to the tEAS is transferred via the selected one, and
   wherein the plurality of possible communication paths between the sEAS and the tEAS comprise at least one of:
      communication between the sEAS and the tEAS via the sEES and tEES, where the communication between the sEES and tEES is outside a public land mobile network (PLMN), but within a data network (DN),
      communication between the sEAS and the tEAS via the sEES and tEES, where the communication between the sEES and tEES is outside the PLMN, via a cloud,
      communication between the sEAS and the tEAS via the sEES and tEES, where the communication between the sEES and tEES is via the PLMN, or
      communication between the sEAS and the tEAS via the sEES and tEES, where the communication between the sEES and tEES is via an edge enabler client (EEC).

7. The edge network of claim 6, wherein the predefined criteria includes at least one of:
   a cost associated with one or more of the plurality of possible communication paths between the sEAS and the tEAS,
   a latency of one or more of the plurality of possible communication paths between the sEAS and the tEAS,
   a nature of data to be transferred, or
   a size of the data to be transferred.

8. The edge network of claim 6, wherein the plurality of possible communication paths between the sEAS and the tEAS further comprise at least one of:
   communication between the sEAS and the tEAS outside the PLMN, but within the DN,
   communication between the sEAS and the tEAS outside the PLMN via the cloud, or
   communication between the sEAS and the tEAS via at least one of the PLMN.

9. The edge network of claim 6, wherein the sEAS and the tEAS are provided in a same edge data network (EDN), offered by one or more providers.

10. The edge network of claim 6, wherein the sEAS and the tEAS are provided in different edge data networks (EDNs), offered by one or more providers.

* * * * *